US008581440B2

(12) United States Patent
Edelson et al.

(10) Patent No.: US 8,581,440 B2
(45) Date of Patent: Nov. 12, 2013

(54) ADAPTIVE PHASE OFFSET CONTROLLER FOR MULTI-CHANNEL SWITCHING POWER CONVERTER

(75) Inventors: Lawrence H. Edelson, Fremont, CA (US); Michael P. Daly, Newtownmountkennedy (IE); Trey Roessig, Palo Alto, CA (US)

(73) Assignee: Analog Devices, Inc., Norwood, MA (US)

( * ) Notice: Subject to any disclaimer, the term of this patent is extended or adjusted under 35 U.S.C. 154(b) by 669 days.

(21) Appl. No.: 12/862,974

(22) Filed: Aug. 25, 2010

(65) Prior Publication Data

US 2011/0049986 A1   Mar. 3, 2011

Related U.S. Application Data

(60) Provisional application No. 61/237,860, filed on Aug. 28, 2009.

(51) Int. Cl.
*H02J 1/00*   (2006.01)

(52) U.S. Cl.
USPC ........................................................... 307/82

(58) Field of Classification Search
USPC ............................................................ 307/82
See application file for complete search history.

(56) References Cited

U.S. PATENT DOCUMENTS 8,208,529 B2 * 6/2012 Yang et al. ..................... 375/233

\* cited by examiner

*Primary Examiner* — Robert L. Deberadinis
(74) *Attorney, Agent, or Firm* — Schwegman Lundberg & Woessner, P.A.

(57) ABSTRACT

An adaptive phase offset controller for use with a switching power converter having first and second channels. The controller includes a discriminator which detects a 'critical condition' in which a switching signal for the first channel transitions during a critical time interval so as to give rise to crosstalk that can corrupt the operation of the second channel's control circuit. When the discriminator detects a critical condition, a phase offset circuit offsets the phase of the first channel's switching signals, such that subsequent transitions occur outside of the critical time interval. A second discriminator and phase offset circuit are preferably employed to detect critical conditions which can give rise to crosstalk that can corrupt the operation of the first channel's control circuit.

18 Claims, 4 Drawing Sheets

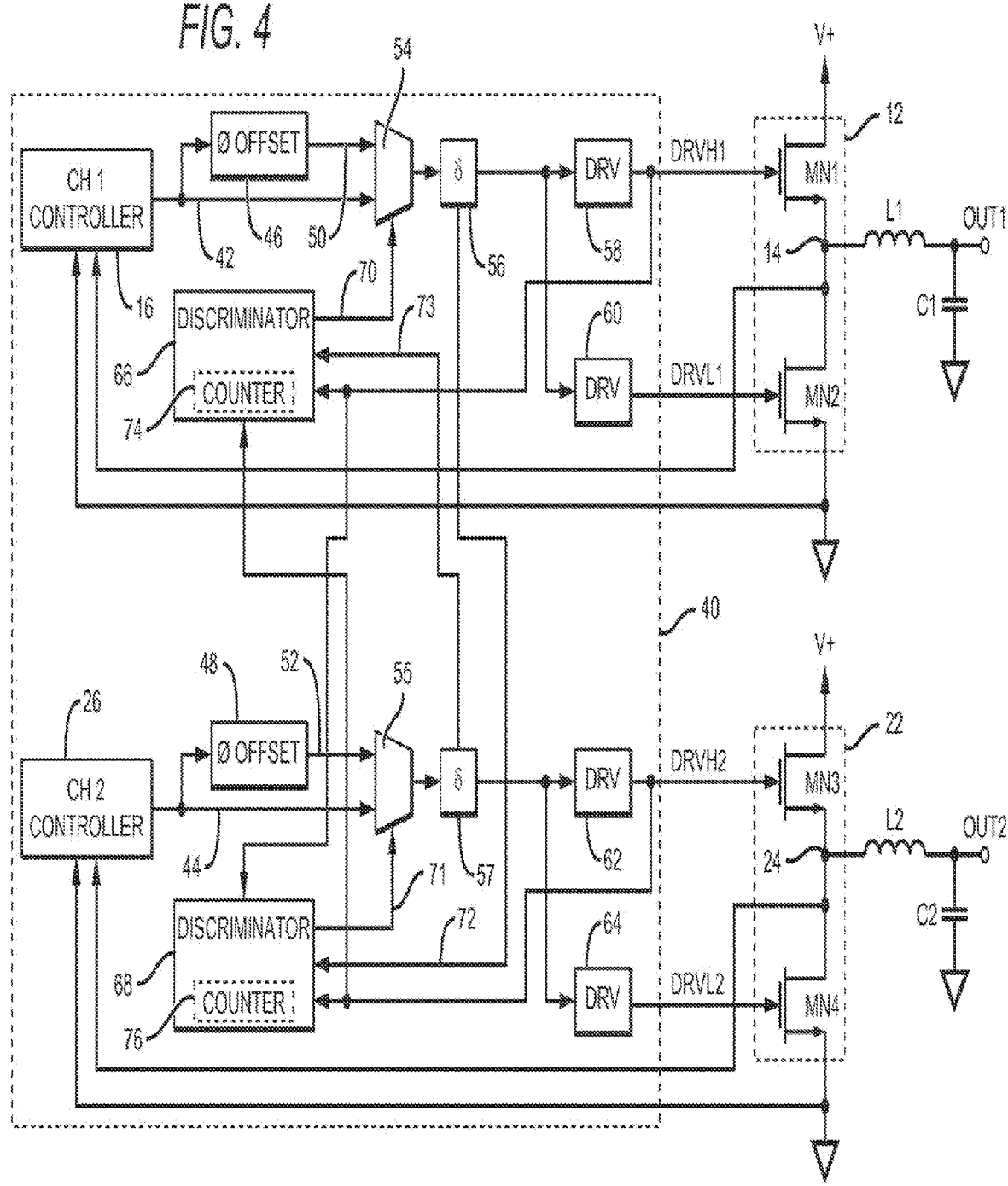

ADAPTIVE PHASE OFFSET CONTROLLER FOR MULTI-CHANNEL SWITCHING POWER CONVERTER

RELATED APPLICATIONS

This application claims the benefit of provisional patent application No. 61/237,860, filed in the U.S. Patent and Trademark Office on Aug. 28, 2009.

BACKGROUND OF THE INVENTION

1. Field of the Invention

This invention relates to the field of switching power converters, and particularly to techniques which mitigate crosstalk between the channels of a multi-channel switching power converter.

2. Description of the Related Art

Multi-channel switching power converters, in which two or more switching converters are arrayed in parallel, have become increasingly popular. A two-channel converter, for example, refers to a configuration in which there are two complete converter control circuits on one IC, each of which drives its own inductor, power switch, and synchronous rectifier (depending on the particular converter topology). The two channels are essentially independent, and can be set to provide two different output voltages if desired.

An example of such an arrangement is shown in FIG. 1a, which illustrates a two-channel buck converter. The first channel 10 consists of a switching means 12 which includes a switching transistor MN1 and a second switching transistor MN2 operated as a synchronous rectifier, connected together at a node 14. An output inductor L1 is connected between node 14 and an output node OUT1, and an output capacitor C1 is connected between OUT1 and ground. A controller 16 provides driving signals DRVH1 and DRVL1 to MN1 and MN2, respectively, as needed to provide a desired output voltage at OUT1. The second channel 20 is similarly arranged, with a switching means 22 consisting of transistors MN3 and MN4 connected together at a node 24, output inductor L2, output capacitor C2, and a controller 26 which provides driving signals DRVH2 and DRVL2 to MN3 and MN4, respectively, as needed to provide a desired output voltage at output node OUT2.

A problem can arise in arrangements of this sort. The controllers of some switching power converters operate by performing a signal sampling operation at a predetermined time in the switching cycle. Unfortunately, the sampled signal in the channel of interest can be corrupted if the other channel undergoes a transition during the sampling event. For the purposes of this discussion, the channel of interest will be referred to as the 'Victim' channel and the other channel will be referred to as the 'Aggressor' channel. One particular event that can give rise to this problem is when the Aggressor channel switches from a 'drive high' (DRVH) condition (synchronous rectifier MN2 is off, power switch MN1 on) to a DRVL condition (power switch MN1 off, synchronous rectifier MN2 on) at the same time or approximately 50-100 ns before the Victim channel is sampling a critical signal—e.g., the Vds voltage of synchronous rectifier MN2. This may occur, for example, in a converter using a control scheme which employs an emulated current mode architecture in which the current is measured based on the estimated Rds(on) of the synchronous rectifier (MN2, MN4). At the end of the DRVL condition, a voltage representing this current is saved on a sample-and-hold capacitor to serve as the starting point for the ramp voltage used in the control scheme, which is an emulation of the inductor current. It is this sample-and-hold operation that is sensitive to noise from the other channel.

This scenario is illustrated in FIG. 1b. In this example, a channel's high-side switch (MN1, MN3) is 'on' when DRVH is high, and its low-side switch (MN2, MN4) is 'on' when DRVL is high. Here, the Aggressor channel is CH. 2 and the Victim channel is CH. 1. As part of each channel's control scheme, a sampling operation is performed once per switching cycle, just prior to a transition between a DRVL condition and a DRVH condition, in a window of time δ. If the Aggressor channel switches from a DRVH condition to a DRVL condition during time δ, as it does in FIG. 1b, the resulting crosstalk can corrupt the sampled information and cause jittery response in the Victim channel.

Two channel switching power converters such as those shown in FIG. 1a are typically driven with clocks that are 180° out-of-phase to reduce input voltage ripple. As a result, the crosstalk problem described above is most evident when the Aggressor channel operates at approximately 50% duty cycle. For this reason, the problem is often described (in two-channel switch mode controllers and regulators) as the 50% duty cycle problem.

The 50% duty cycle problem has proven to be particularly vexing. One approach that has been tried involves making the sensing amplifier—used to amplify and condition the Vds voltage of the synchronous rectifier prior to sampling the voltage onto a holding capacitor—impervious to common-mode noise that can give rise to the crosstalk problem described above. Unfortunately, no method of filtering or other means of rejecting the common-mode noise has proven to be practical. Over-filtering by placing a low-pass filter in the signal path on the IC has also been tried, but this ultimately reduced the transient response of the controller, causing it to fail other required performance objectives.

SUMMARY OF THE INVENTION

An adaptive phase offset controller for a multi-channel switching power converter is presented which overcomes the problems noted above.

The present controller is for use with a switching power converter having first and second channels (though additional channels could be accommodated), each of which includes switching means that are operated with respective periodic switching signals and a control circuit which operates by sampling a voltage or current during a predetermined time interval. The controller includes a discriminator means arranged to detect a 'critical condition' in which a switching signal for the first channel transitions during a first critical time interval which includes the predetermined time interval for the second channel so as to give rise to crosstalk which can corrupt the sampling data acquired by the second channel's control circuit. The controller also includes a phase offset circuit, and is arranged to activate and thereby offset the phase of the first channel's switching signals when the discriminator means detects a critical condition, such that subsequent transitions of the first channel's switching signals occur outside of the first critical time interval—thereby avoiding the crosstalk problem.

The controller preferably includes a second discriminator means and phase offset circuit, arranged to offset the phase of the second channel's switching signals when the discriminator means detects a critical condition in which a switching signal for the second channel transitions during a second critical time interval which includes the predetermined time interval for the first channel so as to give rise to crosstalk which can corrupt the sampling data acquired by the first channel's control circuit, such that subsequent transitions of the second channel's switching signals occur outside of the second critical time interval.

To prevent isolated instances of the critical condition (as may occur during transient upsets or from random noise) from triggering the phase offset circuit, the controller is preferably arranged to offset the phase of a channel's switching signals only when the discriminator means detects the occurrence of a critical condition a predetermined number of times during a predetermined time period. This is preferably accomplished with a counting means arranged to count the number of critical conditions that are detected within the predetermined time period, with the phase offset imposed only when the predetermined number of critical conditions occur within the predetermined time period.

Further features and advantages of the invention will be apparent to those skilled in the art from the following detailed description, taken together with the accompanying drawings.

BRIEF DESCRIPTION OF THE DRAWINGS

FIG. 1b is a timing diagram illustrating a potential problem with the switching power converter of FIG. 1a.

FIG. 4 is a simplified block diagram illustrating one possible embodiment of the present two-channel adaptive phase offset controller.

DETAILED DESCRIPTION OF THE INVENTION

The present adaptive phase offset controller is for use with a switching power converter—such as a forced PWM-type of converter—having at least two channels, each of which includes switching means that are operated with respective periodic switching signals and a control circuit which operates by sampling a voltage or current during a predetermined time interval. A two-channel controller is described here, though the present controller could be adapted for use with converters having more than two channels or regulator applications in which the external FETS are integrated within the integrated circuit. The discussion below also assumes a converter topology in which the switching means consists of a power switch and a synchronous rectifier, though the present controller could be adapted for use with other topologies.

Figure 1A:
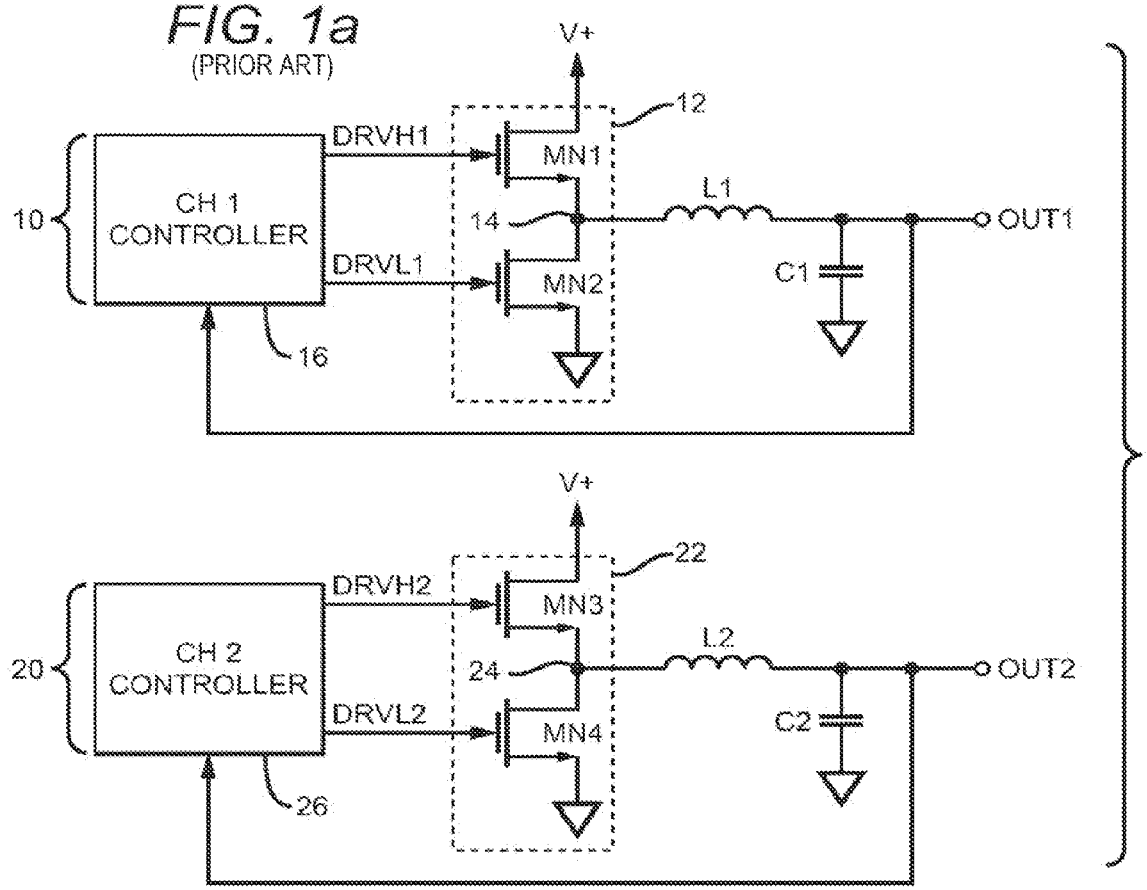
FIG. 1a is a block/schematic diagram of a two-channel switching power converter.
Figure 1B:
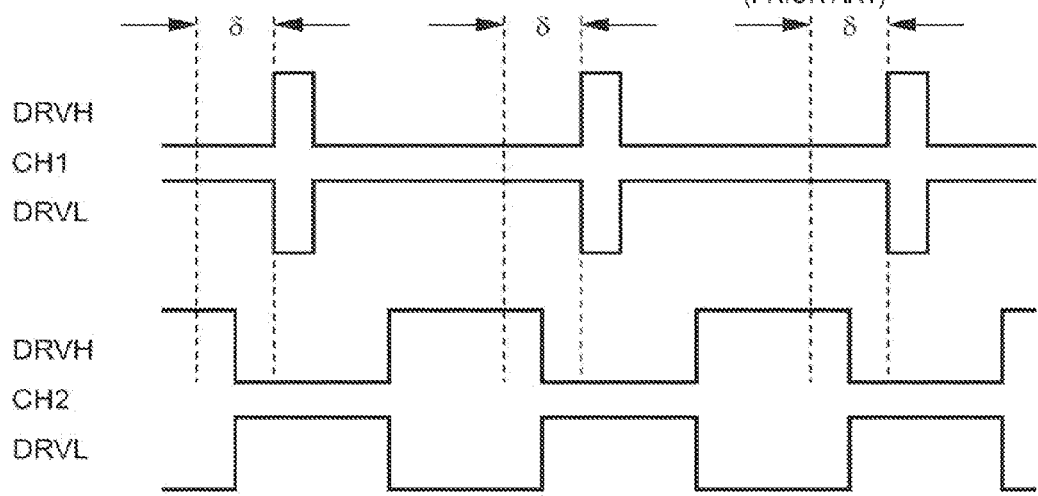

An example of a switching converter with which the present controller might be used is shown in FIG. 1a. Here, first channel 10 has a switching means 12 consisting of a power switch and a synchronous rectifier provided by transistors MN1 and MN2, respectively, connected together at a node 14. Channel 10 also includes output inductor L1 connected between node 14 and output node OUT1, output capacitor C1 connected between OUT1 and ground, and a controller 16 which provides driving signals DRVH1 and DRVL1 to MN1 and MN2, respectively, as needed to provide a desired output voltage at OUT1. Second channel 20 is similarly arranged, with a switching means 22 consisting of transistors MN3 and MN4 connected together at a node 24, output inductor L2, output capacitor C2, and a controller 26 which provides driving signals DRVH2 and DRVL2 to MN3 and MN4, respectively, as needed to provide a desired output voltage at output node OUT2.

As noted above, the controllers of some switching power converters operate by performing a signal sampling operation at a predetermined time in the switching cycle. Unfortunately, when the converter employs multiple channels, the sampled signal in the channel of interest (the 'Victim' channel) can be corrupted due to crosstalk from another channel (the 'Aggressor' channel) that is undergoing a transition during the sampling event.

Figure 2A:
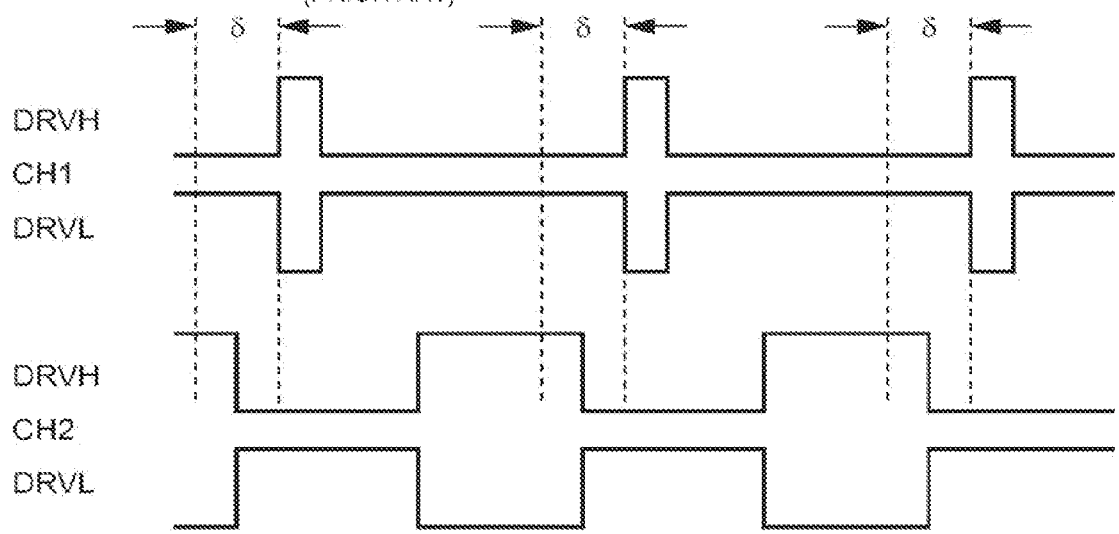
FIG. 2a is a timing diagram illustrating a potential problem with a two-channel switching power converter.

One event that can cause this problem in some converters occurs when the Aggressor channel switches from a 'drive high' (DRVH) condition (synchronous rectifier MN2 is off, power switch MN1 on) to a DRVL condition (power switch MN1 off, synchronous rectifier MN2 on) at the same time or approximately 50-100 ns before the Victim channel is sampling a critical signal—e.g., the Vds voltage of synchronous rectifier MN2; this scenario is illustrated in FIG. 2a. In the timing diagrams used herein, a channel's high-side switch (MN2, MN3) is 'on' when DRVH is high, and its low-side switch (MN2, MN4) is 'on' when DRVL is high. Note that this description of DRVH and DRVL may be a simplification—in practice, there may be a go-high signal that is commanded from an internal channel controller, which is eventually sent off-chip as the DRVH signal after a propagation delay. Herein, DRVH and DRVL are considered to be the signals provided to the high- and low-side switches. Note that the use of NMOS FETs for the high- and low-side switches is merely one possible embodiment. For example, the high-side switches might alternatively be implemented with PMOS FETs, in which case the logic of the DRVH signals would be inverted from that which is shown herein.

In the example shown in FIG. 2a, the Aggressor channel is CH. 2 and the Victim channel is CH. 1; the duty cycle for CH. 2 is approximately 50%. As part of each channel's control scheme, a sampling operation is performed once per switching cycle, just prior to a transition from a DRVL condition and a DRVH condition, in a window of time δ. If the Aggressor channel switches from a DRVH condition to a DRVL condition during time δ, as it does in FIG. 2a, the resulting crosstalk can corrupt the sampled information and cause jittery response in the Victim channel. As explained above, this crosstalk problem is most evident when the Aggressor channel operates at approximately 50% duty cycle, such that the problem is often described (in two-channel switch mode controllers and regulators) as the 50% duty cycle problem.

The present adaptive phase shift controller reduces or eliminates the crosstalk problem by detecting the conditions that give rise to the problem, and then shifting the phase of the Aggressor signal responsible. This is accomplished with the use of a 'discriminator means' (or simply 'discriminator') and a phase offset circuit. The discriminator is arranged to detect a 'critical condition' in which a switching signal for an Aggressor channel transitions during a critical time interval, which includes the predetermined time interval for the Victim channel, so as to give rise to crosstalk which can corrupt the sampling data acquired by the Victim channel's control circuit. In the example discussed above, the critical time interval is the window of time δ during which the Victim channel is sampling, and the discriminator is arranged to detect the occurrence of a transition of the Aggressor channel's switching signals during time δ, if such a transition could give rise to crosstalk that can corrupt the Victim channel's sampling data. Depending on the specific application, the offending transition may be from a DRVH to a DRVL condition as discussed above, or from a DRVL to a DRVH condition if such a transition might corrupt the Victim's sampling, or from both DRVH to DRVL and DRVL to DRVH transitions. Note that, though time window δ is shown as terminating when the Victim channel transitions from a DRVL condition and a DRVH condition, the system is not limited to such an implementation. For example, the window δ might alternatively extend somewhat beyond the DRVL to DRVH transition. The critical time interval should include any period of time during which a transition by an Aggressor channel could give rise to crosstalk that can corrupt the Victim channel's sampling data.

Figure 2B:
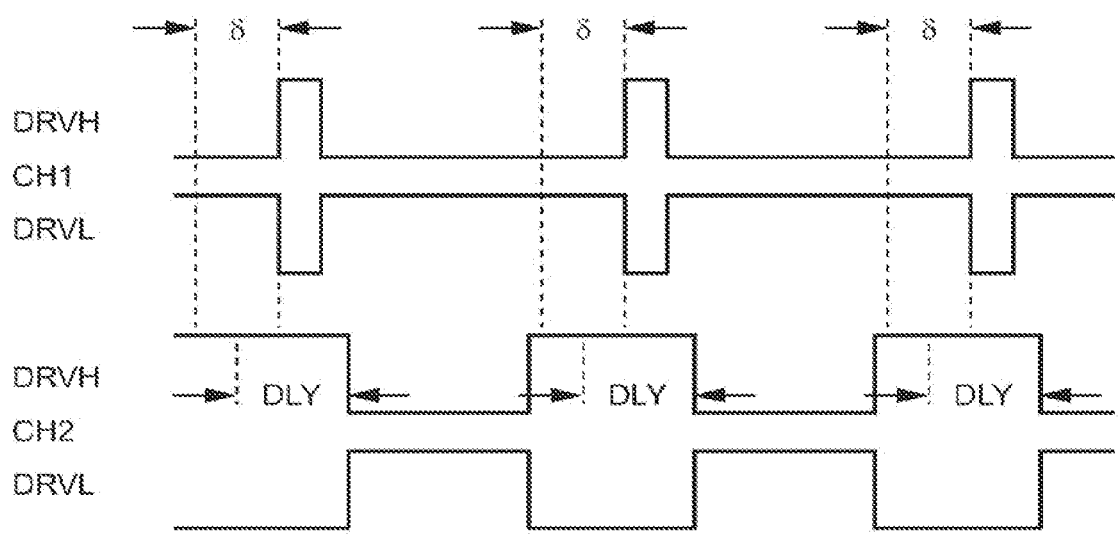
FIG. 2b is a timing diagram illustrating the operation of the present adaptive phase offset controller as it might be used with a two-channel switching power converter.

When the discriminator detects the occurrence of a critical condition, or a number of such occurrences within a predetermined time period (discussed below), a phase offset circuit is activated, which is arranged to offset the phase of the Aggressor channel's switching signals such that subsequent transitions of the switching signals occur outside of the critical time interval δ. This is illustrated in FIG. 2b. In this example, a delay of, for example, 150 ns is imposed on the DRVH to DRVL transition for the Aggressor channel (CH. 2), such that subsequent transitions occur outside of the critical time interval. By so doing, crosstalk with CH. 1 and possible corruption of its sampling data is reduced or eliminated.

Note that "offsetting the phase" of the Aggressor channel's switching signals preferably consists of delaying them, though it is understood that an equivalent result could be obtained by advancing the signals instead. Also note that the adaptive phase offset controller operates by imposing a relative shift in the timing relationship between the switching signals of respective channels. As such, it is understood that delaying the Aggressor channel's switching signals is equivalent to advancing the Victim channel's switching signals, and vice versa. It should also be noted that 'activating' a phase offset circuit can refer to enabling an offset functionality that can be switched on and off as needed, or providing a circuit which outputs an offset switching signal and selecting the offset signal to be output instead of the non-offset version of the signal.

To prevent isolated instances of the critical condition (as may occur during transient upsets or from random noise) from triggering the phase offset circuit, the controller is preferably arranged to offset the phase of the Aggressor channel's switching signals only when the discriminator detects the occurrence of a critical condition a predetermined number of times during a predetermined time period. This is preferably accomplished with a counting means arranged to count the number of critical conditions that are detected within the predetermined time period, with the controller arranged to activate the phase offset circuit only when the counting means indicates that the predetermined number of critical conditions have occurred within the predetermined time period. The counting means could be provided with, for example, a low-pass counting algorithm.

As any channel of a multi-channel switching power converter could become an Aggressor channel, there is preferably a discriminator means provided for each channel. For example, for the two-channel converter example discussed above, a first discriminator is provided to detect a transition on CH. 2 (the Aggressor channel) that adversely affects the performance of CH. 1 (the Victim channel). However, CH. 1 could also serve as the Aggressor channel, with CH. 2 becoming the Victim channel. To detect this condition, a second discriminator means is preferably provided to detect a second critical condition in which a switching signal for CH. 1 transitions during a second critical time interval which includes the predetermined time interval for CH. 2 so as to give rise to crosstalk which can corrupt the sampling data acquired by CH. 1's control circuit. When the required number of second critical conditions is detected, a second phase offset circuit would be activated to offset the phase of the CH. 1 switching signal such that subsequent transitions of the switching signal occur outside of the second critical time interval.

Figure 3A:
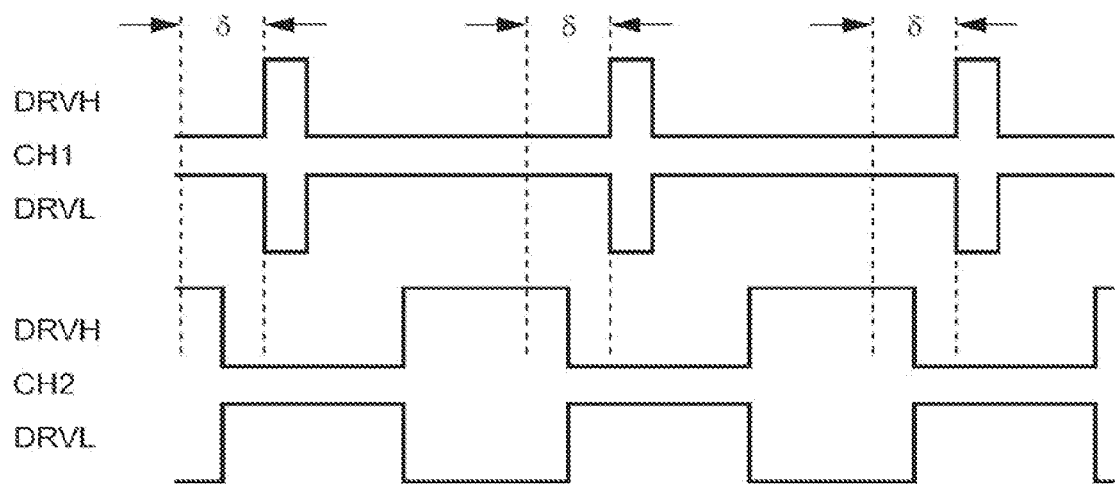
FIG. 3a is a timing diagram illustrating a potential problem with a two-channel switching power converter.
Figure 3B:
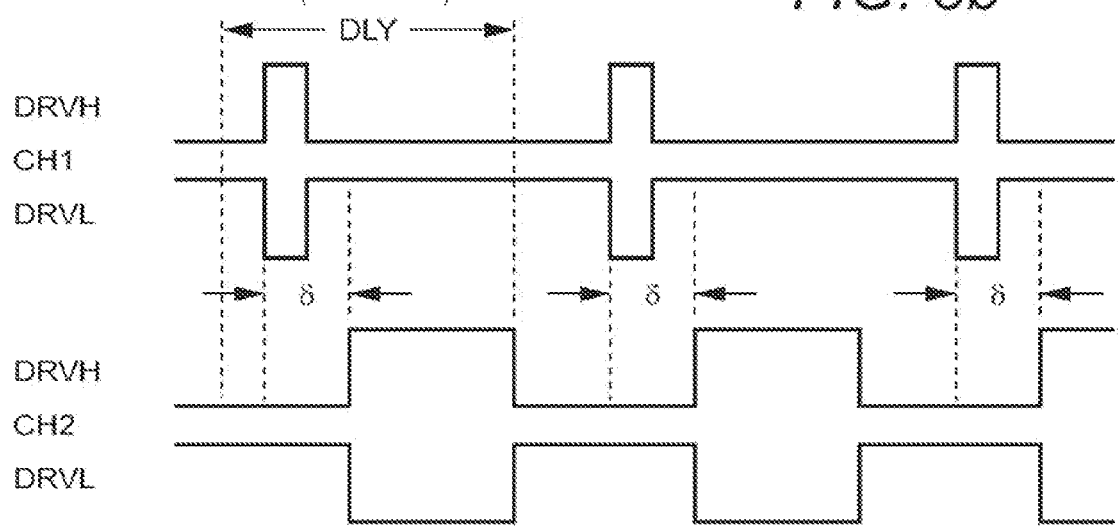
FIG. 3b is a timing diagram illustrating the operation of the present adaptive phase offset controller as it might be used with a two-channel switching power converter.

It is recognized that offsetting the phase of the Aggressor channel as described above can, in some circumstances, cause the Victim channel to become an Aggressor channel. This is illustrated in FIGS. 3a and 3b. In FIG. 3a, CH. 2 is the Aggressor channel and CH. 1 is the Victim channel, with CH. 2 switching from a DRVH condition to a DRVL condition during CH. 1's critical time interval δ. In FIG. 3b, this critical condition has been detected by a discriminator, which activates the phase offset circuit and thereby offsets the phase of CH. 2's DRVH and DRVL signals so that subsequent transitions occur outside of critical time interval δ.

However, as indicated in FIG. 3b, there is also a critical time interval δ associated with CH. 2; in the example shown, the critical time interval δ for CH. 2 occurs just prior to a transition between a DRVL condition and a DRVH condition. Unfortunately, now CH. 1 switches from a DRVH condition to a DRVL condition during CH. 2's critical time interval δ, such that CH. 1 has become the Aggressor channel and CH. 2 the Victim channel. One possible reaction to this condition would be to offset the phase of CH. 1's switching signals in the same manner in which the phase of CH. 2's switching signals was offset. However, as offsetting both channels in the same manner is equivalent to offsetting neither channel, doing this would result in the switching signals simply reverting back to the relationship shown in FIG. 3a. As such, the present controller is preferably arranged such that, when a second critical condition is detected after the phase of the first channel's switching signals has been offset in response to the detection of a first critical condition:

the second phase offset circuit offsets the phase of the second channel's switching signals such that they transition outside of the second critical time interval, and the phase offset that had been imposed by the first phase offset circuit is canceled; this has the effect of advancing the first channel's switching signals with respect to the second channel's switching signals, and—if the offsets are properly chosen—will guarantee that neither channel is interfering with the other.

Figure 3C:
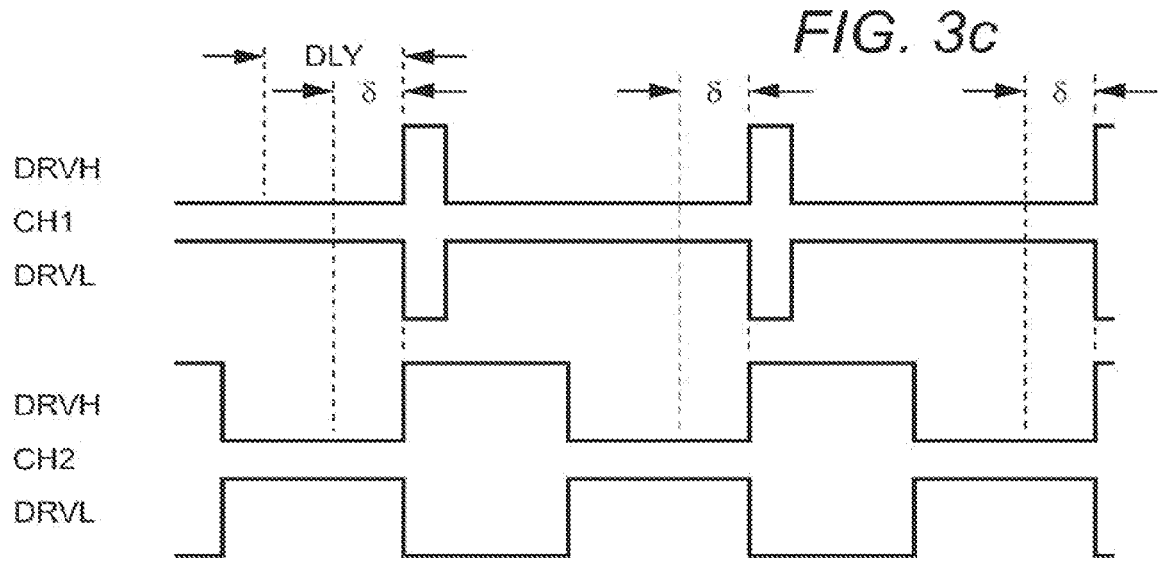
FIG. 3c is a timing diagram further illustrating the operation of the present adaptive phase offset controller as it might be used with a two-channel switching power converter.

This functionality is illustrated in FIG. 3c. Here, with CH. 1 being the Aggressor channel, the phase of the CH. 1 switching signals has been offset as shown, while the offset of the CH. 2 switching signals that had been imposed in FIG. 3b is cancelled. This results in the crosstalk problem being alleviated, with neither channel being Aggressor or Victim.

Similarly, the present controller is preferably arranged such that, when a first critical condition is detected after the phase of the second channel's switching signal has been offset in response to the detection of a second critical condition:

the first phase offset circuit offsets the phase of the first channel's switching signal such that it transitions outside of the first critical time interval, and the phase offset that had been imposed by the second phase offset circuit is canceled; this has the effect of advancing the second channel's switching signals with respect to the first channel's switching signals.

Critical time interval δ is typically 50-100 ns; this is needed because the disruptive effects from the Aggressor channel (e.g., ringing on the ground and supply voltage inputs) may persist for a length of time that may, on poor board layouts, continue up to 100 ns.

An adaptive phase offset controller as described herein could be implemented in many different ways. For example, the discriminator means and phase offset circuits could be implemented with combinatorial logic using well-known techniques, with the delay imposed by a phase offset circuit realized with, for example (but not limited to), a capacitor, a timing current (preferably integrated in a current-limited logic gate), and suitable threshold logic. A simplified block diagram illustrating one possible embodiment of a two-channel adaptive phase offset controller 40 is shown in FIG. 4. As before, respective circuits 16, 26 implement the control scheme for each converter channel; in this example, switching control signals 42, 44 are generated by circuits 16, 26 in response to the voltage across the Rds of synchronous rectifier FETs MN2 and MN4. Each switching control signal is provided to the input of a phase offset circuit 46, 48, which produces a delayed version of the signal 50, 52 at its output. The delayed and non-delayed switching control signals are provided to a multiplexer 54, 55, the output of which is delivered to a fixed delay circuit 56, 57 which establishes the duration of time window $\delta$; the delayed signal is then delivered to driver circuits 58, 60, 62, 64 which in turn produce signals DRVH1, DRVL1, DRVH2 and DRVL2. Each channel also includes a discriminator circuit 66, 68, each of which receives inputs (e.g., DRVH1 and DRVH2) that indicate the switching status of both channels, and produces outputs 70, 71 which control the operation of multiplexers 54 and 55; discriminators 66 and 68 receive control signals 72, 73 from delay circuits 57 and 56, respectively, to determine if a critical condition is detected within a critical time interval. If desired, controller 40 includes counting means 74, 76, either within or external to discriminator circuits 66, 68, to determine whether a predetermined number of critical conditions have been detected within a critical time interval.

In operation, when discriminator 66 detects that CH. 1's switching signals may give rise to a critical condition which affects the performance of CH. 2, multiplexer 54 is switched to select the output 50 of phase offset circuit 46, such that DRVH1 and DRVL1 are delayed. Similarly, when discriminator 68 detects that CH. 2's switching signals may give rise to a critical condition which affects the performance of CH. 1, multiplexer 55 is switched to select the output 52 of phase offset circuit 48, such that DRVH2 and DRVL2 are delayed. As noted above, each discriminator is also preferably arranged to operate its multiplexer so as to switch back to the non-delayed switching control signal (and thereby advance the switching signals) if imposing a delay on one channel gives rise to a critical condition on that channel.

While particular embodiments of the invention have been shown and described, numerous variations and alternate embodiments will occur to those skilled in the art. Accordingly, it is intended that the invention be limited only in terms of the appended claims.

We claim:

1. An adaptive phase offset controller for a switching power converter having first and second channels, each of which includes switching means that are operated with respective periodic switching signals and a control circuit which operates by sampling a voltage or current during a predetermined time interval, comprising:

a first discriminator means arranged to detect a first critical condition in which a switching signal for said first channel transitions during a first critical time interval which includes the predetermined time interval for said second channel so as to give rise to crosstalk which can corrupt the sampling data acquired by said second channel's control circuit; and a first phase offset circuit, said controller arranged such that said first phase offset circuit is activated and offsets the phase of said first channel's switching signals when said first discriminator detects said first critical condition such that subsequent transitions of said first channel's switching signals occur outside of said first critical time interval.

2. The controller of claim 1, wherein said controller is arranged such that said first phase offset circuit is activated and offsets the phase of said first channel's switching signals only when said first discriminator means detects the occurrence of said first critical condition a predetermined number of times during a predetermined time period.

3. The controller of claim 2, further comprising a counting means arranged to count the number of first critical conditions that are detected within said predetermined time period, said controller arranged to activate said first phase offset circuit only when said counting means indicates that the predetermined number of first critical conditions have occurred within said predetermined time period.

4. The controller of claim 3, wherein said counting means is a low-pass counting algorithm.

5. The controller of claim 1, wherein the switching means for each channel consists of a high-side switch and a low-side switch, said switching means being in a DRVH condition when said high-side switch is closed and in a DRVL condition when said low-side switch is closed, wherein said first critical time interval includes a window of time immediately prior to the occurrence of a transition from a DRVL condition to a DRVH condition for said second channel.

6. The controller of claim 5, wherein said first critical condition further consists of the occurrence of a transition from a DRVH condition to a DRVL condition for said first channel during said first critical time interval.

7. The controller of claim 1, further comprising a second discriminator means arranged to detect a second critical condition in which a switching signal for said second channel transitions during a second critical time interval which includes the predetermined time interval for said first channel so as to give rise to crosstalk which can corrupt the sampling data acquired by said first channel's control circuit; and a second phase offset circuit, said controller arranged such that said second phase offset circuit is activated and offsets the phase of said second channel's switching signals when said second discriminator means detects said second critical condition such that subsequent transitions of said second channel's switching signals occur outside of said second critical time interval.

8. The controller of claim 7, said controller arranged such that, when a second critical condition is detected after the phase of said first channel's switching signals has been offset by said first phase offset circuit in response to the detection of a first critical condition, said second phase offset circuit offsets the phase of said second channel's switching signals such that they transition outside of said second critical time interval and the phase offset imposed on said first channel's switching signals is canceled such that said first channel's switching signals are effectively advanced.

9. The controller of claim 7, said controller arranged such that, when a first critical condition is detected after the phase of said second channel's switching signals has been offset by said second phase offset circuit in response to the detection of a second critical condition, said first phase offset circuit offsets the phase of said first channel's switching signals such that they transition outside of said first critical time interval and the phase offset imposed on said second channel's switching signals is canceled such that said second channel's switching signals are effectively advanced.

10. An adaptive phase offset controller for a switching power converter having first and second channels, each of which includes switching means that are operated with respective switching signals and a control circuit which operates by sampling a voltage or current during a predetermined time interval, comprising:
- a first discriminator means arranged to detect a first critical condition in which a switching signal for said first channel transitions during a first critical time interval which includes the predetermined time interval for said second channel so as to give rise to crosstalk which can corrupt the sampling data acquired by said second channel's control circuit;
- a first counting means arranged to count the number of first critical conditions that are detected within a first predetermined time period;
- a first phase offset circuit, said controller arranged such that said first phase offset circuit is activated and offsets the phase of said first channel's switching signals when said first counting means indicates that a predetermined number of first critical conditions have occurred within said first predetermined time period, such that subsequent transitions of said first channel's switching signals occur outside of said first critical time interval;
- a second discriminator means arranged to detect a second critical condition in which a switching signal for said second channel transitions during a second critical time interval which includes the predetermined time interval for said first channel so as to give rise to crosstalk which can corrupt the sampling data acquired by said first channel's control circuit;
- a second counting means arranged to count the number of second critical conditions that are detected within a second predetermined time period; and
- a second phase offset circuit, said controller arranged such that said second phase offset circuit offset the phase of said second channel's switching signals when said second counting means indicates that a predetermined number of second critical conditions have occurred within said second predetermined time period, such that subsequent transitions of said second channel's switching signals occur outside of said second critical time interval.

11. The controller of claim 10, wherein the switching means for each channel consists of a high-side switch and a low-side switch, said switching means being in a DRVH condition when said high-side switch is closed and in a DRVL condition when said low-side switch is closed;
- wherein said first critical time interval includes a window of time immediately prior to the occurrence of a transition from a DRVL condition to a DRVH condition for said second channel and said first critical condition further consists of the occurrence of a transition from a DRVH condition to a DRVL condition for said first channel during said first critical time interval; and
- wherein said second critical time interval includes a window of time immediately prior to the occurrence of a transition from a DRVL condition to a DRVH condition for said first channel and said second critical condition further consists of the occurrence of a transition from a DRVH condition to a DRVL condition for said second channel during said second critical time interval.

12. The controller of claim 10, said controller arranged such that, when a second critical condition is detected after the phase of said first channel's switching signals has been offset by said first phase offset circuit in response to the detection of a first critical condition, said second phase offset circuit offsets the phase of said second channel's switching signals such that they transition outside of said second critical time interval and the phase offset imposed on said first channel's switching signals is canceled such that said first channel's switching signals are effectively advanced;
- said controller further arranged such that, when a first critical condition is detected after the phase of said second channel's switching signals has been offset by said second phase offset circuit in response to the detection of a second critical condition, said first phase offset circuit offsets the phase of said first channel's switching signals such that they transition outside of said first critical time interval and the phase offset imposed on said second channel's switching signals is canceled such that said second channel's switching signals are effectively advanced.

13. A method of reducing crosstalk between first and second channels of a switching power converter, each of said channels including switching means that are operated with respective periodic switching signals and a control circuit which operates by sampling a voltage or current during a predetermined time interval, comprising:
- detecting a first critical condition in which a switching signal for said first channel transitions during a first critical time interval which includes the predetermined time interval for said second channel so as to give rise to crosstalk which can corrupt the sampling data acquired by said second channel's control circuit; and
- offsetting the phase of the first channel's switching signals when said first critical condition is detected such that subsequent transitions of said first channel's switching signals occur outside of said first critical time interval.

14. The method of claim 13, further comprising counting the number of times that said first critical condition is detected during a predetermined time period, wherein said step of offsetting the phase of the first channel's switching signals is performed only when said first critical condition occurs a predetermined number of times during said predetermined time period.

15. The method of claim 13, wherein the switching means for each channel consists of a high-side switch and a low-side switch, said switching means being in a DRVH condition when said high-side switch is closed and in a DRVL condition when said low-side switch is closed, wherein said first critical time interval includes a window of time immediately prior to the occurrence of a transition from a DRVL condition to a DRVH condition for said second channel and said first critical condition further consists of the occurrence of a transition from a DRVH condition to a DRVL condition for said first channel during said first critical time interval.

16. The method of claim 13, further comprising:
- detecting a second critical condition in which a switching signal for said second channel transitions during a second critical time interval which includes the predetermined time interval for said first channel so as to give rise to crosstalk which can corrupt the sampling data acquired by said first channel's control circuit; and
- offsetting the phase of the second channel's switching signals when said second critical condition is detected such that subsequent transitions of said second channel's switching signal occur outside of said second critical time interval.

17. The method of claim 13, such that, when a second critical condition is detected after the phase of said first channel's switching signal has been offset in response to the detection of a first critical condition, said method further comprises:
  offsetting the phase of said second channel's switching signals such that they transition outside of said second critical time interval and cancelling the phase offset imposed on said first channel's switching signals such that said first channel's switching signals are effectively advanced.

18. The method of claim 13, such that, when a first critical condition is detected after the phase of said second channel's switching signals has been offset in response to the detection of a second critical condition, said method further comprises:
  offsetting the phase of said first channel's switching signals such that they transition outside of said first critical time interval and cancelling the phase offset imposed on said second channel's switching signals such that said second channel's switching signals are effectively advanced.

* * * * *